(12) United States Patent
Gyoten (10) Patent No.: US 9,703,185 B2
(45) Date of Patent: Jul. 11, 2017

(54) SEMICONDUCTOR LIGHT SOURCE DRIVING APPARATUS AND PROJECTION VIDEO DISPLAY APPARATUS

(71) Applicant: Panasonic Intellectual Property Management Co., Ltd., Osaka (JP)

(72) Inventor: Takaaki Gyoten, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/265,089

(22) Filed: Sep. 14, 2016

(65) Prior Publication Data

US 2017/0075204 A1    Mar. 16, 2017

(30) Foreign Application Priority Data

Sep. 15, 2015  (JP) .................................. 2015-181456

(51) Int. Cl.
*H05B 37/00*  (2006.01)
*G03B 21/20*  (2006.01)
*H04N 9/31*  (2006.01)
*H05B 37/02*  (2006.01)

(52) U.S. Cl.
CPC ....... *G03B 21/2053* (2013.01); *G03B 21/204* (2013.01); *H04N 9/3164* (2013.01); *H05B 37/0209* (2013.01)

(58) Field of Classification Search
CPC ............ H05B 33/0815; H05B 33/0845; H05B 33/0851; H05B 37/02; H05B 39/044; H05B 33/0824; H05B 37/0263; H05B 33/0809; H05B 37/0272; H05B 37/029; H05B 37/0245; H05B 37/0254; H05B 33/089; H05B 39/041
See application file for complete search history.

(56) References Cited

U.S. PATENT DOCUMENTS

| | | | |
|---|---|---|---|
| 9,615,424 B2 * | 4/2017 | Ido ........................ | H05B 33/089 |
| 9,622,312 B2 * | 4/2017 | Takahashi .......... | H05B 33/0845 |
| 2009/0303308 A1 | 12/2009 | Itoh et al. | |
| 2013/0127353 A1 * | 5/2013 | Athalye ............. | H05B 33/0815 315/193 |
| 2013/0257406 A1 * | 10/2013 | Hausman, Jr. ............ | G05F 5/00 323/300 |

FOREIGN PATENT DOCUMENTS

| | | | |
|---|---|---|---|
| JP | 2009-295791 A | 12/2009 | |
| JP | 2009-295792 A | 12/2009 | |

* cited by examiner

*Primary Examiner* — Monica C King
(74) *Attorney, Agent, or Firm* — McDermott Will & Emery LLP

(57) ABSTRACT

Prior to a rising timing of a switching signal, a second FET is turned ON for a predetermined period according to a voltage switching signal. This allows a sum of a supply voltage of a first switching power source and a supply voltage of a second switching power source to be applied to a series circuit of a semiconductor light source, a drain-source of a first FET, and a current detecting resistor for a predetermined period before and after the rising timing of the switching signal.

14 Claims, 5 Drawing Sheets

SEMICONDUCTOR LIGHT SOURCE DRIVING APPARATUS AND PROJECTION VIDEO DISPLAY APPARATUS

RELATED APPLICATIONS

This application claims the benefit of Japanese Application No. 2015-181456, filed on Sep. 15, 2015, the disclosure of which is incorporated by reference herein.

BACKGROUND

1. Technical Field

The present disclosure relates to a semiconductor light source driving apparatus that supplies a current to drive series-connected semiconductor light source elements.

2. Description of the Related Art

Unexamined Japanese Patent Publication No. 2009-295791 discloses a semiconductor light source driving apparatus that has a plurality of driving circuits. Each of the driving circuits has a current regulating circuit, a light emitting diode (LED), and a voltage detector. The current regulating circuit includes an operational amplifier, a current detecting resistor, and a field effect transistor (FET). The LED is connected between a power source and a drain of the FET. The voltage detector detects a voltage applied across the LED. The semiconductor light source driving apparatus adaptively controls a power source voltage based on a voltage applied to each of the LEDs to increase power efficiency.

SUMMARY

A semiconductor light source driving apparatus in accordance with one aspect of the present disclosure is an apparatus for driving a semiconductor light source. The semiconductor light source driving apparatus includes a current regulating circuit, a first direct current power source, a second direct current power source, a supply voltage selector, a detector, and a controller. The current regulating circuit is connected in series to the semiconductor light source. The first direct current power source outputs a direct current voltage. The second direct current power source is connected to the first direct current power source, and outputs a direct current voltage. The supply voltage selector switches between a first supply voltage and a second supply voltage based on a voltage switching signal to selectively output one of the first and second supply voltages to a series circuit of the semiconductor light source and the current regulating circuit. The first supply voltage is a voltage obtained from an output of the first direct current power source. The second supply voltage is a voltage obtained from a series circuit of the first direct current power source and the second direct current power source. The detector detects a voltage at a connecting point of the semiconductor light source and the current regulating circuit. The controller controls the first supply voltage of the first direct current power source based on the voltage detected by the detector. Also, the controller controls a current value of the current regulating circuit based on a switching signal. Prior to a timing at which the current value of the current regulating circuit is increased according to the switching signal, the supply voltage selector is switched according to the voltage switching signal to output the second supply voltage for a predetermined period.

A semiconductor light source driving apparatus in accordance with another aspect of the present disclosure is an apparatus for driving a semiconductor light source. The semiconductor light source driving apparatus includes a first output terminal, a second output terminal, a power source unit, a supply voltage selector, a current regulating circuit, and a controller. The first output terminal and the second output terminal are a pair of output terminals for outputting a driving current to drive the semiconductor light source. The power source unit is a power source having a first voltage terminal, a second voltage terminal, and a common terminal. The supply voltage selector is connected to the first voltage terminal, the second voltage terminal, and the first output terminal. The current regulating circuit is connected between the power source unit and one of the first output terminal and the second output terminal, and regulates a driving current for driving the semiconductor light source. The controller controls the current regulating circuit and the power source unit to control the driving current. The power source unit applies a first voltage across the common terminal and the first voltage terminal, the first voltage being a voltage capable of driving the semiconductor light source in a steady state. Also, the power source unit applies a second voltage across the common terminal and the second voltage terminal, the second voltage being a higher voltage than the first voltage. In a control for increasing the driving current, the controller controls the current regulating circuit to regulate a current flowing through the current regulating circuit. Also, in the control for increasing the driving current, the controller increases the first voltage. The supply voltage selector switches between a first path and a second path to select one of the first and second paths as a path of a current flowing through the first output terminal. The first path is a path connecting the first voltage terminal and the first output terminal. The second path is a path connecting the second voltage terminal and the first output terminal. In the control for increasing the driving current, the supply voltage selector controls such that a main path of a current flowing through the supply voltage selector becomes the second path for a predetermined period including a timing at which the controller increases the current flowing through the current regulating circuit.

The semiconductor light source driving apparatus according to the present disclosure can improve a delay of increase of the current flowing through a semiconductor light source element in a case where power is supplied from a switching power source.

DETAILED DESCRIPTION

Hereinafter, exemplary embodiments will be described with reference to the accompanying drawings as appropriate. However, unnecessarily detailed description may occasionally be omitted. For example, detailed description of well-known matters and redundant description of substantially the same configuration may occasionally be omitted. This is to avoid the following description from becoming unnecessarily redundant, and to allow any person skilled in the art to easily understand the description.

Also, it should be noted that the following description and the accompanying drawings are provided to allow any person skilled in the art to fully understand the present disclosure, and that it is not intended to limit the subject matter described in the claims by the following description and the accompanying drawings.

First Exemplary Embodiment

Hereinafter, a first exemplary embodiment will be described with reference to FIGS. 1 to 4.

1-1. Configuration

Figure 1:
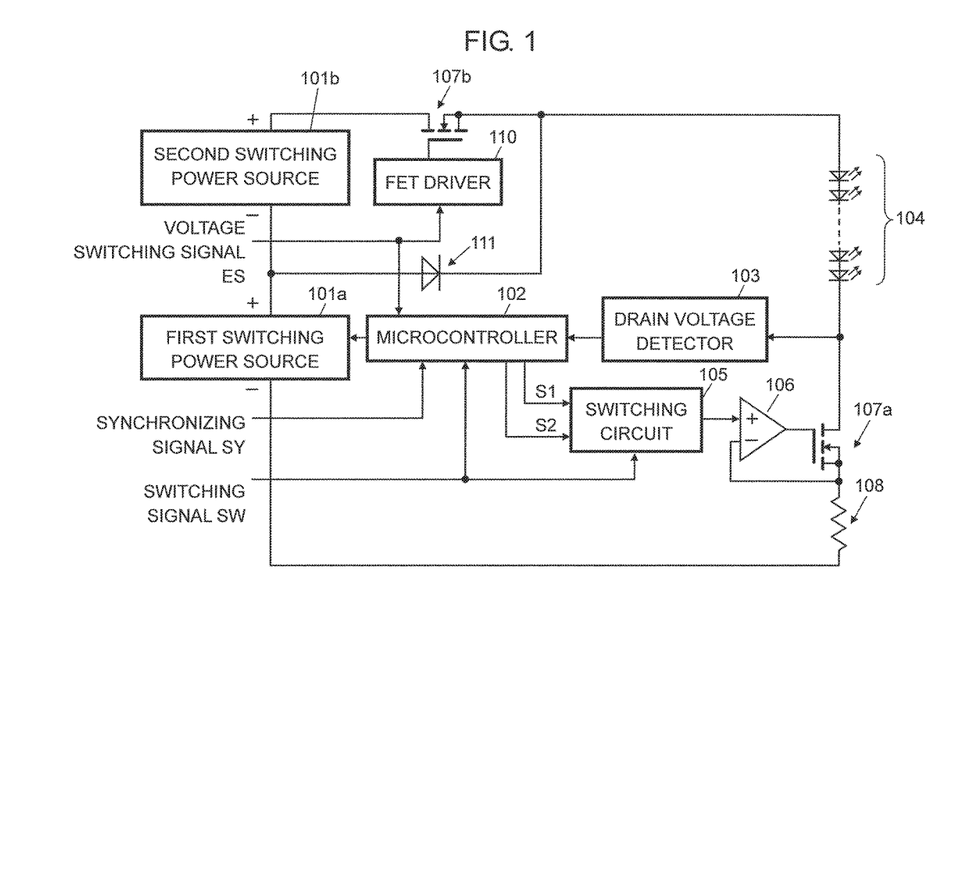
FIG. 1 is a block diagram of a semiconductor light source driving apparatus according to a first exemplary embodiment.

FIG. 1 is a block diagram of a semiconductor light source driving apparatus.

As shown in FIG. 1, the semiconductor light source driving apparatus includes first switching power source 101a, second switching power source 101b, microcontroller 102, drain voltage detector 103, semiconductor light source 104, and switching circuit 105. Semiconductor light source 104 is configured by a plurality of semiconductor light source elements which are connected in series. A laser diode (LD) may be used as each of the semiconductor light source elements. Switching circuit 105 switches between its two inputs to output one of the two inputs. The semiconductor light source driving apparatus includes operational amplifier 106, first field effect transistor (FET) 107a, second FET 107b, current detecting resistor 108, FET driver 110, and diode 111. An output terminal of switching circuit 105 is connected to an input terminal of operational amplifier 106. FET driver 110 drives second FET 107b to turn ON or turn OFF second FET 107b. First switching power source 101a is an example of a first direct current (DC) power source. Second switching power source 101b is an example of a second DC power source. Microcontroller 102 is an example of a controller.

In the present exemplary embodiment, an N-channel metal-oxide-semiconductor FET (MOSFET) is used as each of first FET 107a and second FET 107b. However, another switching element such as a P-channel MOSFET may be used as each of first FET 107a and second FET 107b. Also, second switching power source 101b may be another DC power source.

An anode of diode 111 is connected to a positive (+) terminal of first switching power source 101a. One end of semiconductor light source 104, which is configured by series-connected LDs, is connected to a cathode of diode 111. The other end of semiconductor light source 104 is connected to a drain of first FET 107a. A source of first FET 107a is connected to a negative (−) terminal of first switching power source 101a through current detecting resistor 108.

A negative (−) terminal of second switching power source 101b is connected to the positive (+) terminal of first switching power source 101a. Also, a positive (+) terminal of second switching power source 101b is connected to a drain of second FET 107b. A source of second FET 107b is connected to the cathode of diode 111. Second FET 107b is turned ON or turned OFF by FET driver 110 which is driven by voltage switching signal ES.

Here, assuming that a potential at the negative (−) terminal of first switching power source 101a is a reference potential, a voltage obtained at the positive (+) terminal of first switching power source 101a is defined as a first supply voltage. Similarly, a voltage obtained at the positive (+) terminal of second switching power source 101b is defined as a second supply voltage.

When second FET 107b is in an OFF state, a driving current flowing through semiconductor light source 104 is supplied from the positive (+) terminal of first switching power source 101a to a positive (+) terminal of semiconductor light source 104 through diode 111. In other words, a voltage which is dropped from the first supply voltage by a forward voltage of diode 111 is applied to the positive (+) terminal of semiconductor light source 104.

When second FET 107b is in an ON state, on the other hand, the driving current flowing through semiconductor light source 104 is supplied from the positive (+) terminal of second switching power source 101b to the positive (+) terminal of semiconductor light source 104 through second FET 107b. In other words, a voltage which is dropped from the second supply voltage by a voltage drop at second FET 107b is applied to the positive (+) terminal of semiconductor light source 104.

Although a laser diode (LD) is used as the semiconductor light source element in the present exemplary embodiment, the semiconductor light source element may be a light emitting diode (LED).

The semiconductor light source driving apparatus shown in FIG. 1 may be applied to an illumination apparatus for a projector (a projection video display apparatus) that uses a one-chip digital micro-mirror device (DMD) as a light modulation element.

1-2. Operations

Operations of the semiconductor light source driving apparatus configured as above will be described with reference to FIGS. 1 to 4.

FET driver 110 controls second FET 107b to turn to the OFF state when voltage switching signal ES is at a LOW level. FET driver 110 controls second FET 107b to turn to the ON state when voltage switching signal ES is at a HIGH level.

Here, assume that voltage switching signal ES is at the LOW level. Since semiconductor light source 104 and current detecting resistor 108 are connected in series, a current which is identical to the driving current flowing through semiconductor light source 104 flows through current detecting resistor 108. When the driving current flows through current detecting resistor 108, a voltage that is proportional to a current value of the driving current appears across current detecting resistor 108. As a result, the source voltage of first FET 107a rises in proportion to the current value of the driving current. Operational amplifier 106 controls the gate voltage of first FET 107a based on the voltage detected by current detecting resistor 108 and a voltage output from switching circuit 105. Specifically, operational amplifier 106 amplifies a potential difference between the output terminal of switching circuit 105 and the source of first FET 107a to drive the gate of first FET 107a. This allows operational amplifier 106 to control the gate voltage of first FET 107a so as to decrease the potential difference between the output terminal of switching circuit 105 and the source of first FET 107a. Generally, the gain of operational amplifier 106 is extremely large. Therefore, the voltage output from switching circuit 105 and the source voltage of first FET 107a become substantially equal to each other. In other words, a current dependent on the voltage output from switching circuit 105 flows through semiconductor light source 104, first FET 107a, and current detecting resistor 108. In this manner, operational amplifier 106, first FET 107a, and current detecting resistor 108 operate as a current regulating circuit for controlling the driving current flowing through semiconductor light source 104.

In order to control the driving current flowing through semiconductor light source 104 to be constant by first FET 107a, it is necessary that a certain degree of voltage is applied across the drain and source of first FET 107a. Herein, description is made on such a constant current control that the driving current of semiconductor light source 104 is controlled to become target current value It. The current regulating circuit of the present exemplary embodiment controls the driving current of semiconductor light source 104 to be constant, target current value It by changing the resistance between the drain and source of first FET 107a. For the current regulating circuit to regulate the driving current to be constant in the state where the driving current having target current value It is flowing through semiconductor light source 104, it is necessary that resistance value Rfet between the drain and source of first FET 107a is larger than minimum ON-resistance value Rfetmin. In other words, it is necessary that the drain-source voltage (denoted as Vds) of first FET 107a is larger than a product of target current value It and minimum ON-resistance value Rfetmin of first FET 107a, as expressed by Equation (1). Note that minimum ON-resistance value Rfetmin is an ON-resistance value of first FET 107a in the state where a maximum voltage is applied across the gate and source of first FET 107a.

$$Vds > It \times Rfetmin \quad (1)$$

The product of target current value It and minimum ON-resistance value Rfetmin of first FET 107a will be referred to as minimum drain-source voltage Vdsmin.

Assuming that the resistance value of current detecting resistor 108 is denoted as Rs, voltage Vs across current detecting resistor 108 during when the current having target current value It is flowing is expressed by the following Equation (2):

$$Vs = It \times Rs \quad (2)$$

Drain-source voltage Vds of first FET 107a when the current having target current value It is flowing through semiconductor light source 104 can be expressed, by using supply voltage Ve of switching power source 101, voltage Vf across semiconductor light source 104, voltage Vs across current detecting resistor 108, and forward voltage Vfd of diode 111, as the following Equation (3):

$$Vds = Ve - Vf - Vs - Vfd \quad (3)$$

Since the condition of Equation (1) is required to be satisfied, it is necessary to satisfy the following Equation (4):

$$Vds > Vdsmin \quad (4)$$

From Equations (3) and (4), it is necessary to satisfy the following Equation (5):

$$Ve - Vf - Vs - Vfd > Vdsmin$$

$$Ve > Vf + Vs + Vdsmin + Vfd \quad (5)$$

On the other hand, if supply voltage Ve of first switching power source 101a increases under this condition, drain-source voltage Vds of first FET 107a increases by the same amount as the increased amount of supply voltage Ve. In other words, if supply voltage Ve is increased so as to easily allow the condition of Equation (5) to be satisfied, the power loss in first FET 107a increases. In order to suppress the power loss, it is preferable that supply voltage Ve is as close as possible to a condition expressed by the following Equation (6) within the range satisfying Equation (5) when target current value It is the maximum.

$$Ve = Vf + Vs + Vdsmin + Vfd \quad (6)$$

Figure 2:
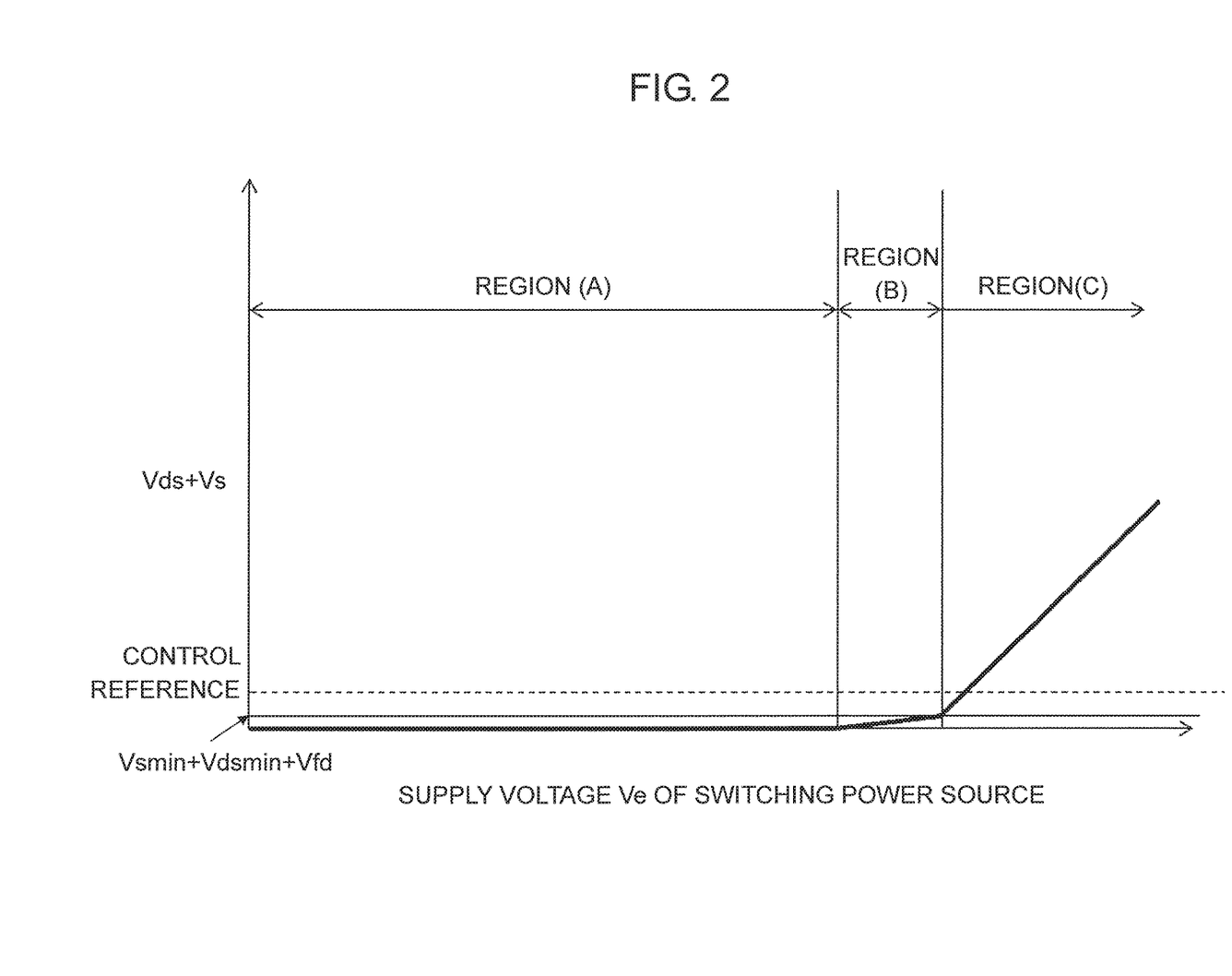
FIG. 2 is a diagram for explaining operations of the semiconductor light source driving apparatus according to the first exemplary embodiment.

FIG. 2 shows the relationship between supply voltage Ve of first switching power source 101a and the sum (Vds+Vs) of drain-source voltage Vds of first FET 107a and voltage Vs across current detecting resistor 108.

Region (A) shown in FIG. 2 is a region in which supply voltage Ve of first switching power source 101a is so small that substantially no current flows through semiconductor light source 104. In region (A), since supply voltage Ve of first switching power source 101a is lower than the forward voltage of semiconductor light source 104, substantially no current flows through semiconductor light source 104. Accordingly, no current flows through first FET 107a and current detecting resistor 108, so that voltage Vs across current detecting resistor 108 is substantially zero. Since Vs is lower than the voltage corresponding to target current value It, operational amplifier 106 operates so as to apply the maximum voltage to the gate of first FET 107a to cause a current to flow through first FET 107a. As a result, the resistance of first FET 107a becomes minimum, so that drain-source voltage Vd becomes substantially zero. Consequently, the sum (Vds+Vs) of drain-source voltage Vds of first FET 107a and voltage Vs across current detecting resistor 108 becomes substantially zero.

Region (B) shown in FIG. 2 is a region in which the driving current flowing through semiconductor light source 104 changes depending on supply voltage Ve of first switching power source 101a. In region (B), supply voltage Ve of first switching power source 101a becomes higher than the forward voltage of semiconductor light source 104, so that a current starts to flow through semiconductor light source 104. By this current, voltages proportional to the flowing current are generated across the drain and source of first FET 107a and across current detecting resistor 108. In this state, since the current flowing through current detecting resistor 108 still remains smaller than the target current value, operational amplifier 106 continues to apply the maximum voltage to the gate of first FET 107a. Also, in this state, the drain-source resistance of first FET 107a still remains low, so that drain-source voltage Vds of first FET 107a still remains substantially zero. Also, since the resistance value of current detecting resistor 108 is generally very small, the value of Vds+Vs is very small. The same operation as the above is continued until supply voltage Ve of switching power source 101 further rises so that the current flowing through current detecting resistor 108 increases to the value equal to the target current value. The maximum value of Vds+Vs in region (B) is the sum (Vs+Vdsmin) of voltage Vs across current detecting resistor 108 and minimum drain-source voltage Vdsmin when the current having target current value It is flowing.

Region (C) shown in FIG. 2 is a region in which a constant current flows. As shown in region (C), when the current having target current value It flows through current detecting resistor 108, operational amplifier 106 operates to control the gate voltage of first FET 107a so as to maintain the current value.

When the flowing current is constant, voltage Vs across current detecting resistor 108 is constant. Also, voltage Vf across semiconductor light source 104 does not change unless its temperature or the like changes. Accordingly, when supply voltage Ve of first switching power source 101a increases, the amount of this increase directly becomes the increase amount of drain-source voltage Vds of first FET 107a, so that the value of Vds+Vs rapidly increases.

Considering the characteristics as described above, the power loss in first FET 107a can be suppressed by detecting the value of Vds+Vs and controlling supply voltage Ve of first switching power source 101a. Microcontroller 102 controls supply voltage Ve of first switching power source 101a so that the value of Vds+Vs becomes control reference value Vr. Here, it is assumed that voltage Vep denotes supply voltage Ve of first switching power source 101a when the value of Vds+Vs becomes control reference value Vr. It is also assumed that control reference value Vr is a voltage value which is slightly higher than Vdsmin+Vs when the current having target current value It is flowing through current detecting resistor 108. In this manner, it is possible to control the current flowing through current detecting resistor 108 to be maintained at target current value It, while suppressing the increase of drain-source voltage Vds of first FET 107a. Accordingly, the power loss in first FET 107a can be suppressed.

As shown in FIG. 1, drain voltage detector 103 detects voltage (Vds+Vs), which is the sum of drain-source voltage Vds of first FET 107a and voltage Vs across current detecting resistor 108, and outputs the detected voltage to microcontroller 102. Specifically, drain voltage detector 103 measures a voltage at a node to which the drain of first FET 107a is connected. Microcontroller 102 controls first switching power source 101a so that the value of Vds+Vs becomes control reference value Vr as described above.

In this manner, it is possible to supply a constant current to semiconductor light source 104 including a plurality of LDs, while suppressing the power loss in first FET 107a.

Meanwhile, voltage Vf across semiconductor light source 104 becomes a constant voltage depending on the flowing current under the condition that the temperature at its junction (hereinafter referred to as the temperature) is constant. Actually, however, the temperature of the LD changes depending on the flowing current. Since the temperature of semiconductor light source 104 is low immediately after a change of the current from a small current to a large current, Vf slightly rises. If the control for increasing the driving current of semiconductor light source 104 is performed in this state, the voltage at the node connected to the drain of first FET 107a becomes lower than the value of Vdsmin+Vs at the time when the current having target current value It is flowing through semiconductor light source 104. As a result, the rising of the driving current of semiconductor light source 104 is delayed. When a current is flowing through semiconductor light source 104, Vf is a sum of forward voltages of the semiconductor light source elements constituting semiconductor light source 104. Accordingly, in the case where semiconductor light source 104 is configured by a large number of semiconductor light source elements which are connected in series, the influence of the temperature dependency of Vf increases.

To avoid occurrence of the above-described situation, according to the present exemplary embodiment, the voltage applied to semiconductor light source 104 and the current regulating circuit is increased just before increasing the driving current. Voltage switching signal ES is input so as to turn second FET 107b to the ON-state prior to the timing at which the driving current is increased. In response to voltage switching signal ES, FET driver 110 drives second FET 107b to turn to the ON-state. Accordingly, the voltage applied to semiconductor light source 104 and the current regulating circuit changes from the first supply voltage to the second supply voltage. As a result, an adequate voltage is applied to the current regulating circuit, so that the driving current of semiconductor light source 104 rises rapidly.

Microcontroller 102 controls the supply voltage of first switching power source 101a based on voltage (Vds+Vs) detected by drain voltage detector 103. At this time, microcontroller 102 detects the drain voltage of first FET 107a during the period in which second FET 107b is in the OFF-state and thus the drain voltage is stable. Accordingly, the drain voltage of first FET 107a can be stably detected. In a case where the sum of drain-source voltage Vds of first FET 107a and voltage Vs across current detecting resistor 108 cannot be measured, a set value of the supply voltage of first switching power source 101a may be determined based on target current value It. For example, a voltage value of first switching power source 101a corresponding to switching signal SW may be stored in advance, and the stored value may be set as the set value of the supply voltage of first switching power source 101a. Accordingly, drain-source voltage Vds of first FET 107a can be adjusted to a desired value.

Meanwhile, switching circuit 105 selects one of selectable inputs S1 and S2, which are outputs from microcontroller 102, according to externally given switching signal SW to output the selected one of selectable inputs S1 and S2 to operational amplifier 106.

Figure 3:
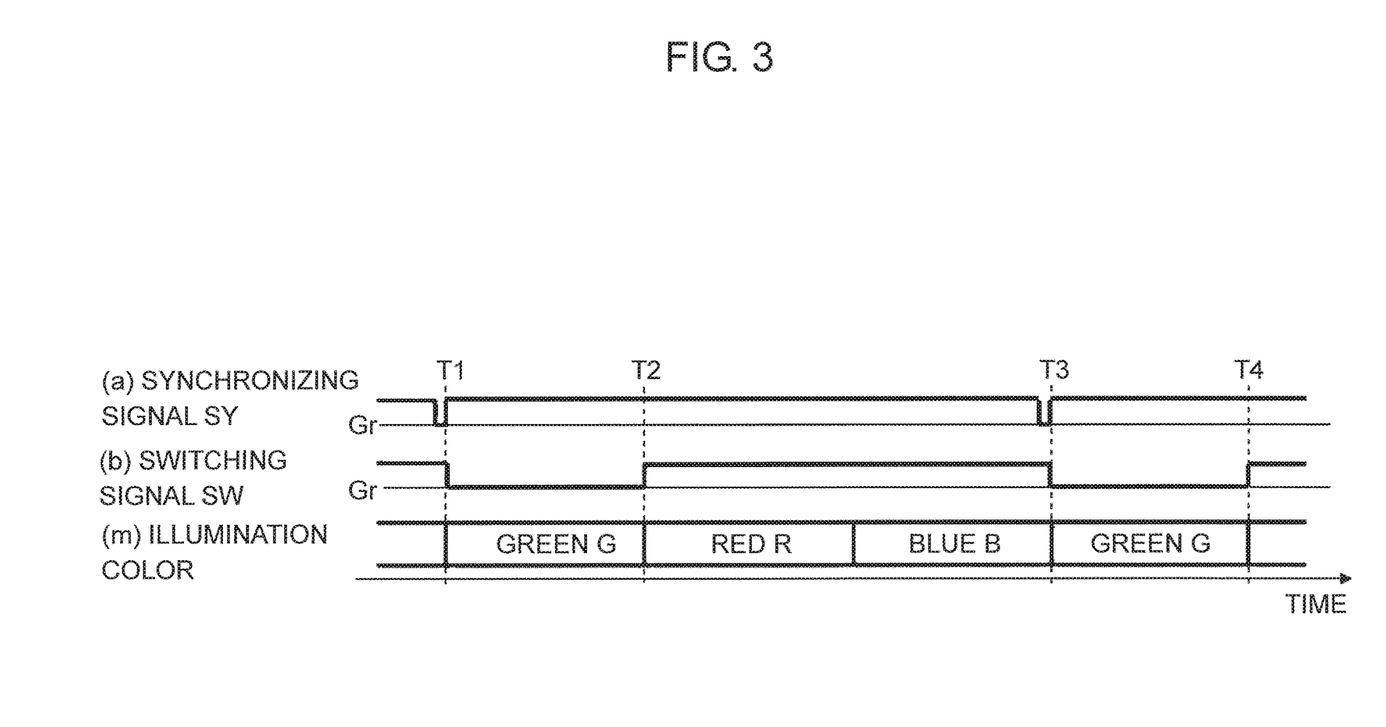
FIG. 3 is a diagram for explaining signals which are input to the semiconductor light source driving apparatus according to the first exemplary embodiment.

FIG. 3 shows relationships among (a) synchronizing signal SY that is input to microcontroller 102, (b) switching signal SW that is input to switching circuit 105, and (m) illumination color.

Here, each of the LDs is an LD that emits blue laser light. Red light R and green light G can be obtained by wavelength conversion with a phosphor using the blue light obtained from the LDs as excitation light. Blue light B can be obtained using the light from the LDs as it is. Brightness of semiconductor light source 104 may be changed depending on the illumination color. In other words, the driving current of semiconductor light source 104 may be controlled to change depending on the illumination color. For example, the driving current of semiconductor light source 104 during the emission periods of red light R and blue light B may be made larger than the driving current of semiconductor light source 104 during the emission period of green light G. In this case, as shown in FIG. 3, switching signal SW becomes the LOW level during the emission period of green light G from timing T1 to timing T2, so that switching signal S2 is output to operational amplifier 106. On the other hand, switching signal SW becomes the HIGH level during the emission periods of red light R and blue light B from timing T2 to timing T3, so that switching signal S1 is output to operational amplifier 106. Note that timing T3 corresponds to timing T1, and timing T4 corresponds to timing T2.

Figure 4:
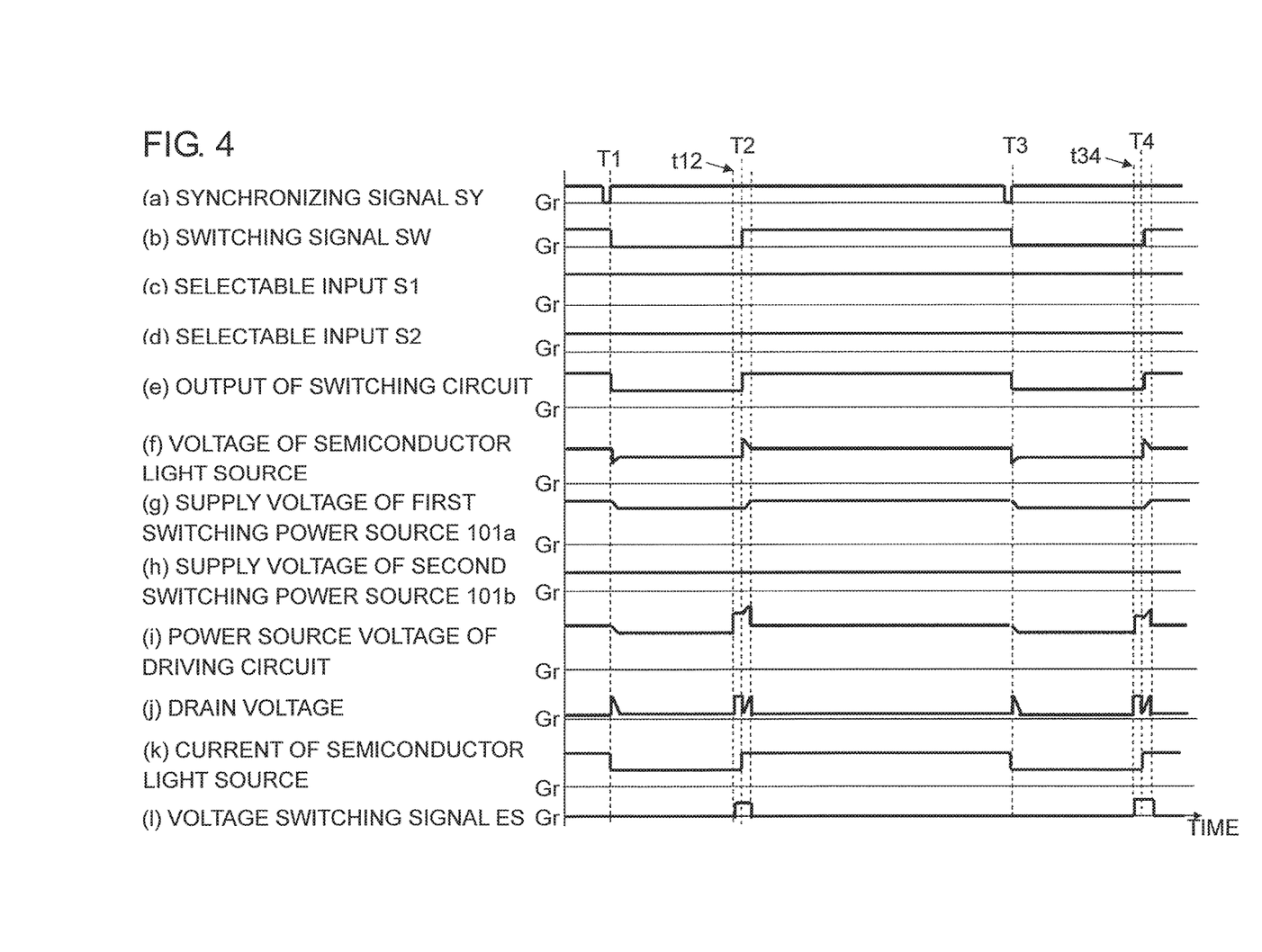
FIG. 4 is a signal waveform diagram showing operations of the semiconductor light source driving apparatus according to the first exemplary embodiment.

FIG. 4 is a signal waveform diagram showing the operations of the semiconductor light source driving apparatus. In FIG. 4, Gr denotes the reference potential.

As shown in FIG. 4, there is a certain correlation on the time axis between synchronizing signal SY and switching signal SW. Synchronizing signal SY is synchronized with the timing of the video signal modulated by the DMD. In FIG. 4, each of timing T1 and timing T3 is a rising timing of synchronizing signal SY. Switching signal SW changes from the HIGH level to the LOW level at timing T1. Also, switching signal SW changes from the LOW level to the HIGH level at timing T2.

Also, as shown in FIG. 4, the signal waveform of voltage switching signal ES is a pulse waveform that becomes the HIGH level in the vicinity of each of timing T2 and timing T4, which are the rising timings of switching signal SW. In other words, voltage switching signal ES is a pulse signal having a predetermined pulse width such that the rising timing of switching signal SW becomes substantially the middle of the HIGH level period of voltage switching signal ES. The pulse waveform of voltage switching signal ES is generated by a pulse generating circuit which is not shown in the figure. The pulse waveform of voltage switching signal ES is input to FET driver 110 and microcontroller 102.

Selectable input S1 and selectable input S2 are voltages corresponding to different target current values It from each other. The voltage of selectable input S1 is higher than the voltage of selectable input S2. In other words, target current value It corresponding to selectable input S1 is larger than target current value It corresponding to selectable input S2. Microcontroller 102 outputs appropriate voltages as selectable input S1 and selectable input S2. Switching circuit 105 outputs one of selectable input S1 and selectable input S2 to operational amplifier 106 based on the input of switching signal SW. That is, like the waveform of the switching circuit output (e) shown in FIG. 4, switching circuit 105 outputs the level of selectable input S1 when switching signal SW is at the HIGH level, and outputs the level of selectable input S2 when switching signal SW is at the LOW level. Operational amplifier 106 drives first FET 107a according to the selected output of switching circuit 105.

When the input of operational amplifier 106 is switched from the state of selecting the LOW level selectable input S2 to the state of selecting the HIGH level selectable input S1 in this manner, the output voltage of operational amplifier 106 increases. In this manner, the driving current of semiconductor light source 104 is controlled so as to increase to target current value It corresponding to the voltage of selectable input S1.

In the steady state of this operation, the temperature of semiconductor light source 104 increases with the increase of the driving current flowing through semiconductor light source 104. However, immediately after the level change of switching signal SW, the temperature still remains low, that is, forward voltage Vf of semiconductor light source 104 is large relative to that in the steady state. If supply voltage Ve of first switching power source 101a is constant, there is a possibility that the increase of target current value It might cause such a condition that Equation (5) cannot be satisfied and thus rising of the driving current is delayed. In other words, with the increase of target current value It, the output voltage of operational amplifier 106 rises to cause a reduction of drain-source resistance Rds of first FET 107a. Accordingly, the driving current flowing through semiconductor light source 104 is increased. However, drain-source resistance Rds of first FET 107a cannot be made smaller than the minimum ON-resistance value. In other words, the driving current flowing through semiconductor light source 104 cannot be increased to a value exceeding a certain value immediately after the level change of switching signal SW. Therefore, the driving current flowing through semiconductor light source 104 remains smaller than target current value It. When the driving current flowing through semiconductor light source 104 is smaller than target current value It in the manner as described above, desired brightness of light cannot be obtained from semiconductor light source 104. Therefore, it is necessary to temporarily raise supply voltage Ve of first switching power source 101a to a higher voltage so that a desired value of target current value It can be obtained at the timing at which the output of switching circuit 105 has been changed from selectable input S2 to selectable input S1.

However, the supply voltage of first switching power source 101a cannot be rapidly changed, because a smoothing capacitor is connected to the output of first switching power source 101a. Therefore, even if microcontroller 102 starts to control first switching power source 101a so as to change supply voltage Ve, a rapid change in supply voltage Ve will not occur.

Therefore, in the case where the control for raising supply voltage Ve of first switching power source 101a is started at timing T2 according to switching signal SW, rising of the driving current flowing through semiconductor light source 104 is delayed by a time required for supply voltage Ve of first switching power source 101a to rise. As a result, during the delay period, the current flowing through the semiconductor light source does not reach the target current value as described above, so that the brightness of the light emitted from semiconductor light source is reduced.

This is undesirable in a case where the semiconductor light source driving apparatus is used for a illumination apparatus for a projection video display apparatus, because the reduced brightness has undesirable influences on the projected image, such, for example, as degradation of the linearity of video brightness.

Particularly, a semiconductor light source driving apparatus which varies the driving current of semiconductor light source 104 according to the illumination color is more likely to be influenced by the delay in the rising of the driving current, because the period of synchronizing signal SY is short in such an apparatus.

As shown in FIG. 4, FET driver 110 turns second FET 107b to the ON state according to voltage switching signal ES. This increases the driving circuit power source voltage (i) shown in FIG. 4, from the power source voltage of first switching power source 101a to a voltage obtained by adding the power source voltage of second switching power source 101b to the power source voltage of first switching power source 101a.

The power source voltage of second switching power source 101b is set to such a voltage value that can supplement the increase of forward voltage Vf associated with the increase of the driving current of semiconductor light source 104 and the increase of forward voltage Vf of semiconductor light source 104 risen because of the temperature fall in the small current state.

By the control as described above, it is possible to prevent occurrence of such a state where the voltage applied to first FET 107a and current detecting resistor 108 (the drain voltage in FIG. 4) is reduced to a value that does not satisfy the condition of Equation (5) at the timing at which switching signal SW has changed (timing T2 in FIG. 4). As a result, the current flowing through semiconductor light source 104 (the semiconductor light source current (k) in FIG. 4) rapidly increases to target current value It at timing T2.

Then, the power source voltage of first switching power source 101a increases to a predetermined voltage. Also, the temperature of semiconductor light source 104 rises, so that voltage Vf across semiconductor light source 104 is reduced. Then, voltage switching signal ES changes from the HIGH level to the LOW level at an appropriate timing to turn second FET 107b to the OFF state. As a result, drain-source voltage Vds of first FET 107a is reduced so that the power loss in first FET 107a is reduced. The timing at which voltage switching signal ES changes from the HIGH level to the LOW level may be a timing that is a predetermined time after timing T2, or may be determined based on target current value It, or may be determined by a threshold value set for the drain voltage of first FET 107a.

As described above, second FET 107b is tuned to the ON state by voltage switching signal ES, prior to the timing at which target current value It of the current regulating circuit is increased. This allows the second supply voltage, which is obtained by adding the supply voltage of second switching power source 101b to the first supply voltage of first switching power source 101a, to be applied across the series circuit of semiconductor light source 104, first FET 107a, and current detecting resistor 108 for a predetermined period before and after the rising timing of switching signal SW.

Note that, when the above-described control is performed, drain-source voltage Vds of first FET 107a rises for a short period before and after each of timings T1 and T2 at which switching signal SW changes as shown by the waveform of the drain voltage (j) shown in FIG. 4. However, since this period is extremely short, an increase of the loss at first FET 107a associated with this rise of voltage Vds is very small. Also, it is not necessary to reduce the supply voltage of the switching power source within a short time at each of timing T1 and timing T3 at which the output of switching circuit 105 changes from selectable input S2 to selectable input S1.

1-3. Advantageous Effects

As described above, according to the present exemplary embodiment, it is possible to reduce the power consumption in first FET 107a, without delaying the increase of the current flowing through semiconductor light source 104.

Also, in the case where semiconductor light source 104 is configured by a number of semiconductor light source elements connected in series, the influence of the temperature dependency of forward voltage Vf increases. However, according to the present exemplary embodiment, it is possible to effectively suppress the delay in the rising of the driving current, which is caused by the temperature dependency of forward voltage Vf of semiconductor light source 104.

Further, according to the present configuration, the drain voltage of first FET 107a is controlled to be reduced at timing T2, at which the voltage applied to semiconductor light source 104 is high, as shown in FIG. 4. As a result, it is possible to reduce the anode voltage of semiconductor light source 104, and thus to reduce a potential difference between semiconductor light source 104 and the ground of the semiconductor light source device.

Second Exemplary Embodiment

Hereinafter, a second exemplary embodiment will be described with reference to FIG. 5.

2-1. Configuration

Figure 5:
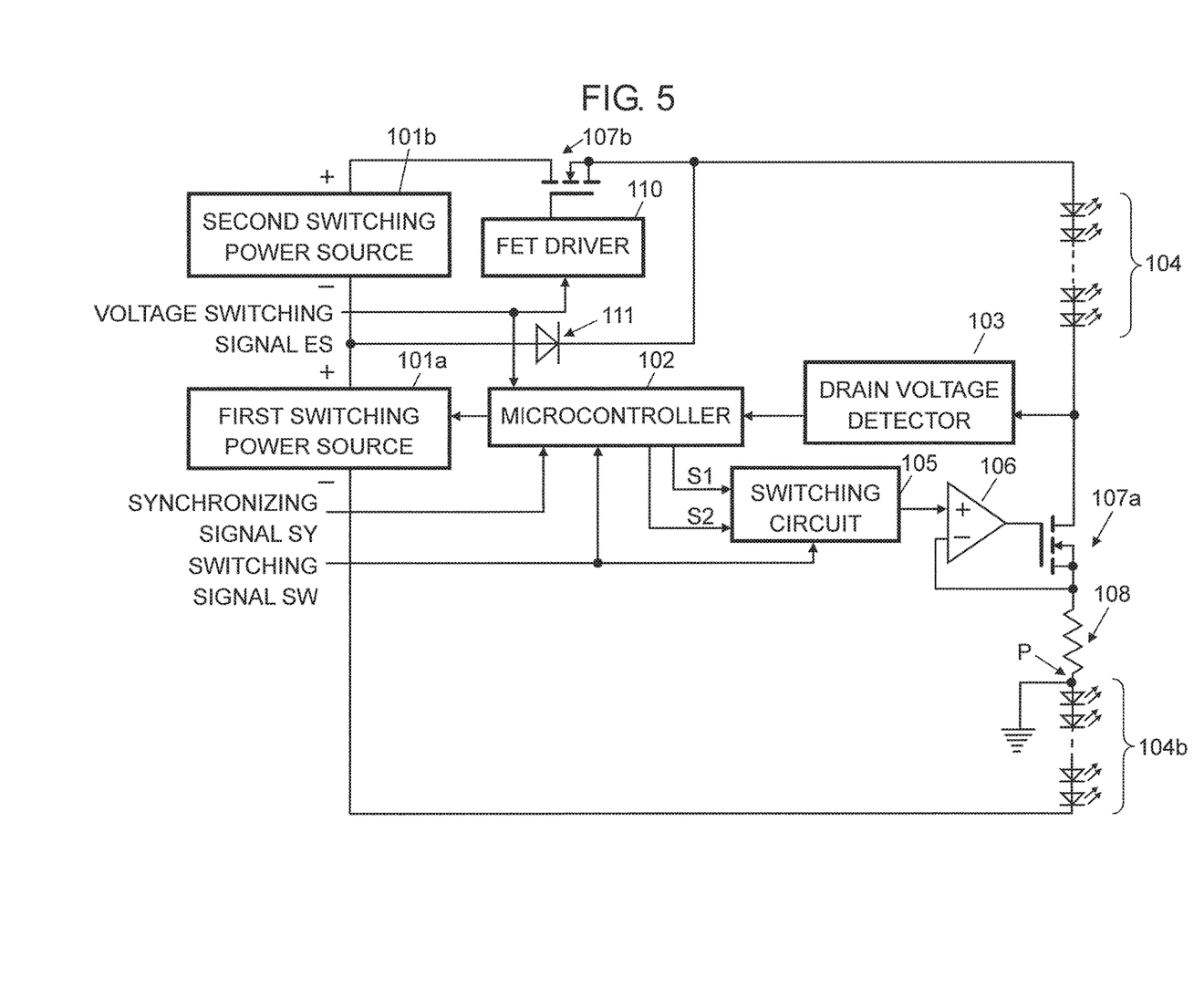
FIG. 5 is a block diagram of a semiconductor light source driving apparatus according to a second exemplary embodiment.

FIG. 5 is a block diagram of a semiconductor light source driving apparatus according to the second exemplary embodiment.

First, differences from the semiconductor light source driving apparatus according to the first exemplary embodiment will be described. The semiconductor light source driving apparatus according to the second exemplary embodiment includes second semiconductor light source 104b in addition to first semiconductor light source 104a, which corresponds to first semiconductor light source 104 according to the first exemplary embodiment. Second semiconductor light source 104b is configured by connecting a plurality of semiconductor light source elements in series, similarly to first semiconductor light source 104a. However, second semiconductor light source 104b may not necessarily be the same in configuration as first semiconductor light source 104a. Further, current detecting resistor 108 included in the current regulating circuit has one end connected to the source of first FET 107a, and has the other end connected to the ground. This end, or node, connected to the ground will hereinafter be referred to as ground node P. Second semiconductor light source 104b is connected between ground node P and the negative terminal of first switching power source 101a so that current flows from ground node P to the negative terminal of first switching power source 101a. In other words, assuming ground node P as a reference point, current flows through second semiconductor light source 104b when the electric potential at the node connected to negative terminal of first switching power source 101a is a negative potential. Also, the voltages output from microcontroller 102 to switching circuit 105 are controlled relative to ground node P as a reference.

2-2. Operations

The semiconductor light source driving apparatus according to the second exemplary embodiment operates in the same way as the semiconductor light source driving apparatus according to the first exemplary embodiment except for the following points. That is, the current flowing through second semiconductor light source 104b inserted between current detecting resistor 108 and the negative terminal of first switching power source 101a is the same as the current flowing through first semiconductor light source 104a inserted between the cathode of diode 111 and first FET 107a. Since the driving current flowing through first semiconductor light source can be controlled in the same way as in the first exemplary embodiment, the driving current flowing through the second semiconductor light source can also be controlled in the same way.

Generally, there is an upper limit of the voltage that can be applied to each of first semiconductor light source 104a and second semiconductor light source 104b. First semiconductor light source 104a has a chassis which is not shown in FIG. 5, and the chassis is connected to the ground in a typical circuit. In other words, if the potential difference between the anode, which has the highest potential in first semiconductor light source 104a, and the ground exceeds a withstand voltage, there is a concern that first semiconductor light source 104a may be damaged. Similarly, if the potential difference between the cathode, which has the lowest potential in second semiconductor light source 104b, and the ground exceeds a withstand voltage, there is a concern that second semiconductor light source 104b may be damaged. This problem is remarkable in a semiconductor light source driving apparatus that uses a high voltage to drive a semiconductor light source.

2-3. Advantageous Effects

In the second exemplary embodiment, not only the same advantageous effects as those of the semiconductor light source driving apparatus according to first exemplary embodiment can be obtained, but also a larger number of semiconductor light source elements can be driven without increasing the potential difference between the semiconductor light source and the ground. In other words, even if the power source voltage supplied from the DC power source is made twice as high as that of the first exemplary embodiment, it is possible to drive the semiconductor light source without exceeding the withstand voltage of the semiconductor light source. It is possible, by raising the power source voltage, to increase the ratio of the power that is used to emit the semiconductor light source among the power supplied from the power source, so that the power efficiency can be increased.

Further, it is possible by a single current regulating circuit to effectively suppress the delay in the rising of the driving current flowing through each of first semiconductor light source 104a and second semiconductor light source 104b. In other words, the technique according to the present disclosure is particularly effective for a semiconductor light source driving apparatus having a plurality of semiconductor light sources.

Further, the technique according to the present disclosure is particularly effective for a semiconductor light source driving apparatus that uses a high voltage power source. The technique according to the present disclosure is effective in a case of using first switching power source 101a that can supply a voltage of at least 50 V or more, although depending on the withstand voltage of the semiconductor light source.

Further, first semiconductor light source 104a and second semiconductor light source 104b may be the same as or different from each other in configuration. For example, it is possible to add second semiconductor light source 104b which is the same in configuration as first semiconductor light source 104a to increase the brightness of the semiconductor light source more than the semiconductor light source driving apparatus according to the first exemplary embodiment. As another example, it is possible to use a half of the plurality of LDs of first semiconductor light source 104 according to the first exemplary embodiment as first semiconductor light source 104a, and the remaining half as second semiconductor light source 104b to realize the brightness equivalent to that of the semiconductor light source driven by the semiconductor light source driving apparatus according to the first exemplary embodiment.

Other Exemplary Embodiments

In the above description, first and second exemplary embodiments have been described as examples of technique disclosed in the present application. However, the technique according to the present disclosure is not limited to the above-described exemplary embodiments, and may be applied to other exemplary embodiments in which modifications, substitutions, additions, and/or omissions are made. Also, the structural components described in the first and second exemplary embodiments may be appropriately combined to configure a new exemplary embodiment.

For example, although MOSFET is used as the current control element in the first and second exemplary embodiments, the present disclosure is not limited thereto. For example, it is possible to use other switching elements such as a bipolar transistor or an insulated gate bipolar transistor (IGBT).

Also, microcontroller 102 can set two target current values by using two selectable inputs S1 and S2 as the input signals to switching circuit 105. However, it is possible to set three or more target current values by using three or more selectable inputs.

In each of the first and second exemplary embodiments, the first switching power source and the second switching power source may be configured by using a single power source that has a plurality of output terminals. This makes it possible to obtain the similar effects with a single power source.

In the first and second exemplary embodiments, diode 111 is used as a rectifier for preventing reverse flow of current from the source of second FET 107b to the negative terminal of second switching power source 101b. However, the rectifier may be realized by a third FET that is controlled to turn ON and OFF at timings opposite to the ON/OFF timings of second FET 107b. This can prevent the reverse flow of current in the same way as diode 111. That is, the third FET functions as a rectifier for preventing a reverse flow of current. This is advantageous in that the voltage loss, which may occur at diode 111 in the case of using diode 111, can be suppressed. However, the use of diode 111 as a rectifier is advantageous in that the circuit configuration can be simplified, and that short circuit current can be prevented from flowing between second FET 107b and the third FET.

The semiconductor light source driving apparatus according to the present disclosure may also be defined as follows. That is, a semiconductor light source driving apparatus according to the first exemplary embodiment includes a power source unit, a supply voltage selector, a current regulating circuit, and a controller. Also, the semiconductor light source driving apparatus includes a first output terminal and a second output terminal for connecting semiconductor light source 104. The first output terminal corresponds to a point to which the anode of semiconductor light source 104 is connected. The second output terminal corresponds to a point to which the cathode of semiconductor light source 104 is connected.

The power source unit has a common terminal that corresponds to the negative terminal of first switching power source 101a, a first voltage terminal that corresponds to the positive terminal of first switching power source 101a, and a second voltage terminal that corresponds to the positive terminal of second switching power source 101b. A first voltage applied across the first voltage terminal and the common terminal corresponds to a voltage output from first switching power source 101a. The first voltage is a voltage that can cause the driving current having target current value It to flow to the semiconductor light source in the steady state. A second voltage that is applied across the second voltage terminal and the common terminal is a sum of the voltage output from first switching power source 101a and a voltage output from second switching power source 101b. The second voltage is higher than the first voltage by the voltage output from second switching power source 101b.

The controller corresponds to microcontroller 102, switching circuit 105, operational amplifier 106, and so on, and controls the driving current. The controller controls target current value It of the current regulating circuit, and also controls the supply voltage of first switching power source 101a to control the first voltage.

The supply voltage selector corresponds to second FET 107b and diode 111, and switches between a first path and a second path. The first path is a path that connects the positive terminal of first switching power source 101a and the semiconductor light source. The second path is a path that connects the positive terminal of second switching power source 101b and the semiconductor light source. Diode 111 is a rectifier that prevent reverse flow of current from the positive terminal of second switching power source 101b to the negative terminal of second switching power source 101b through second FET 107b when second FET 107b is in the ON state.

Further, the semiconductor light source driving apparatus has a detector that corresponds to microcontroller 102 and drain voltage detector 103. The detector detects the drain voltage of first FET 107a to detect how much margin is left for the drain-source voltage of first FET 107a, or to detect the operating state of the current regulating circuit including first FET 107a. Microcontroller 102, which corresponds to the controller, appropriately controls the first voltage based on the operating state of the current regulating circuit to improve the power efficiency.

The semiconductor light source driving apparatus according to the second exemplary embodiment further includes a third output terminal and a fourth output terminal. A semiconductor light source connected between the first output terminal and the second output terminal corresponds to first semiconductor light source 104a. A second semiconductor light source connected between the third output terminal and the fourth output terminal corresponds to second semiconductor light source 104b. In the first and second exemplary embodiments, the current regulating circuit is connected between the second output terminal and the common terminal. In the second exemplary embodiment, second semiconductor light source 104b is additionally connected between the current regulating circuit and the common terminal.

In the exemplary embodiments, a case has been described in which the electric potentials at the first voltage terminal and the second voltage terminal are higher than the potential at the common terminal. However, the present disclosure is not limited thereto. For example, the positive terminal and the negative terminal may be reversed. In other words, the electric potentials at the first voltage terminal and the second voltage terminal may be made lower than the potential at the common terminal so that the driving current flows from the common terminal to the first voltage terminal or the second voltage terminal through the current regulating circuit and the semiconductor light source.

The present disclosure can be used for a semiconductor light source driving apparatus that drives a light source configured by a plurality of semiconductor light source elements connected in series, and is applicable to a light source for a projector and a light source for lighting, for example.

What is claimed is:

1. A semiconductor light source driving apparatus for driving a semiconductor light source, the apparatus comprising:
   a current regulating circuit connected in series to the semiconductor light source;
   a first direct current power source that outputs a direct current voltage;
   a second direct current power source that is connected to the first direct current power source, and outputs a direct current voltage;
   a supply voltage selector that switches between a first supply voltage and a second supply voltage based on a voltage switching signal to selectively output one of the first and second supply voltages to a series circuit of the semiconductor light source and the current regulating circuit, the first supply voltage being a voltage obtained from an output of the first direct current power source, and the second supply voltage being a voltage obtained from a series circuit of the first direct current power source and the second direct current power source;
   a detector that detects a voltage at a connecting point of the semiconductor light source and the current regulating circuit; and
   a controller that controls the first supply voltage of the first direct current power source based on the voltage detected by the detector, and controls to increase or decrease a current value of the current regulating circuit based on a switching signal,
   wherein, prior to a timing at which the current value of the current regulating circuit is increased according to the switching signal, the supply voltage selector is switched according to the voltage switching signal to output the second supply voltage for a predetermined period.

2. The semiconductor light source driving apparatus according to claim 1, wherein
   the supply voltage selector comprises:
   a diode connected between an output terminal of the first supply voltage of the first direct current power source and the semiconductor light source; and
   a field effect transistor that is connected between an output terminal of the second supply voltage of the second direct current power source and the semiconductor light source, and is turned ON or OFF according to the voltage switching signal.

3. A projection video display apparatus comprising:
   the semiconductor light source driving apparatus according to claim 2; and
   a semiconductor light source driven by the semiconductor light source driving apparatus.

4. A projection video display apparatus comprising:
   the semiconductor light source driving apparatus according to claim 1; and
   a semiconductor light source driven by the semiconductor light source driving apparatus.

5. A semiconductor light source driving apparatus for driving a semiconductor light source, the apparatus comprising:
   a first output terminal and a second output terminal that are a pair of output terminals for outputting a driving current to drive the semiconductor light source;
   a power source unit that is a power source having a first voltage terminal, a second voltage terminal, and a common terminal;
   a supply voltage selector connected to the first voltage terminal, the second voltage terminal, and the first output terminal;
   a current regulating circuit that is connected between the power source unit and one of the first output terminal and the second output terminal, and regulates a driving current for driving the semiconductor light source; and
   a controller that controls the current regulating circuit and the power source unit to control the driving current,
   wherein
   the power source unit applies:
   a first voltage across the common terminal and the first voltage terminal, the first voltage being a voltage capable of driving the semiconductor light source in a steady state; and
   a second voltage across the common terminal and the second voltage terminal, the second voltage being a voltage higher than the first voltage,
   in a control for increasing the driving current, the controller:
   controls the current regulating circuit to regulate a current flowing through the current regulating circuit; and
   increases the first voltage,
   the supply voltage selector switches between a first path and a second path to select one of the first and second paths as a path of a current flowing through the first output terminal, the first path being a path connecting the first voltage terminal and the first output terminal, and the second path being a path connecting the second voltage terminal and the first output terminal, and
   in the control for increasing the driving current, the supply voltage selector performs control such that a main path of a current flowing through the supply voltage selector becomes the second path for a predetermined period including a timing at which the controller increases the current flowing through the current regulating circuit.

6. The semiconductor light source driving apparatus according to claim 5, wherein
the supply voltage selector includes:
a switching element connected between the first voltage terminal and the first output terminal; and
a rectifier connected between the second voltage terminal and the first output terminal,
the rectifier prevents a current flow through a path including the switching element and the rectifier, and
the supply voltage selector turns the switching element to:
an ON state in a case of performing control such that the main path of the current flowing through the supply voltage selector becomes the second path; and
an OFF state in a case of performing control such that the main path of the current flowing through the supply voltage selector becomes the first path.

7. The semiconductor light source driving apparatus according to claim 6, wherein the rectifier is a diode that is connected in such a direction that a reverse voltage is applied to the rectifier when the switching element is in the ON state.

8. The semiconductor light source driving apparatus according to claim 7, further comprising a detector that detects an operation state of the current regulating circuit,
wherein the controller controls the first voltage based on the operation state of the current regulating circuit obtained by the detector.

9. The semiconductor light source driving apparatus according to claim 7, further comprising a third output terminal and a fourth output terminal that are a pair of output terminals for connecting a second semiconductor light source,
wherein the current regulating circuit is connected between the second output terminal and the third output terminal,
the fourth output terminal is connected to the common terminal, and
the current regulating circuit and the common terminal are connected through the second semiconductor light source that is connected between the third output terminal and the fourth output terminal.

10. The semiconductor light source driving apparatus according to claim 6, further comprising a detector that detects an operation state of the current regulating circuit,
wherein the controller controls the first voltage based on the operation state of the current regulating circuit obtained by the detector.

11. The semiconductor light source driving apparatus according to claim 6, further comprising a third output terminal and a fourth output terminal that are a pair of output terminals for connecting a second semiconductor light source,
wherein the current regulating circuit is connected between the second output terminal and the third output terminal,
the fourth output terminal is connected to the common terminal, and
the current regulating circuit and the common terminal are connected through the second semiconductor light source that is connected between the third output terminal and the fourth output terminal.

12. The semiconductor light source driving apparatus according to claim 5, further comprising a detector that detects an operation state of the current regulating circuit,
wherein the controller controls the first voltage based on the operation state of the current regulating circuit obtained by the detector.

13. The semiconductor light source driving apparatus according to claim 5, further comprising a third output terminal and a fourth output terminal that are a pair of output terminals for connecting a second semiconductor light source,
wherein the current regulating circuit is connected between the second output terminal and the third output terminal,
the fourth output terminal is connected to the common terminal, and
the current regulating circuit and the common terminal are connected through the second semiconductor light source that is connected between the third output terminal and the fourth output terminal.

14. The semiconductor light source driving apparatus according to claim 5, wherein
the semiconductor light source comprises a plurality of semiconductor light source elements, and
a total forward voltage of the semiconductor light source is 50 V or higher.

* * * * *